United States Patent [19]
Schwing et al.

[11] Patent Number: 4,776,450
[45] Date of Patent: Oct. 11, 1988

[54] TWIN-BELT BAND CONVEYOR

[75] Inventors: Friedrich W. Schwing, Dorstener Str. 424, D-4690 Herne 2; Dipl.-Kfm. G. Schwing, Herne, both of Fed. Rep. of Germany

[73] Assignee: Friedrich W. Schwing, Fed. Rep. of Germany

[21] Appl. No.: 878,975

[22] PCT Filed: Aug. 30, 1985

[86] PCT No.: PCT/DE85/00297
§ 371 Date: Jun. 11, 1986
§ 102(e) Date: Jun. 11, 1986

[87] PCT Pub. No.: WO86/01491
PCT Pub. Date: Mar. 13, 1986

[30] Foreign Application Priority Data
Sep. 5, 1984 [DE] Fed. Rep. of Germany ....... 3432553

[51] Int. Cl.[4] .............................................. B65G 15/18
[52] U.S. Cl. ..................... 198/626; 198/847; 198/715
[58] Field of Search ............... 198/626, 604, 715, 628, 198/847

[56] References Cited
U.S. PATENT DOCUMENTS

| | | | |
|---|---|---|---|
| 2,670,837 | 3/1954 | Hansen | 198/713 |
| 2,902,142 | 9/1959 | Girardi | 198/715 |
| 3,603,448 | 9/1971 | Okano et al. | 198/628 |
| 3,982,626 | 9/1976 | Mehta | 198/626 |
| 4,195,724 | 4/1980 | Janitsch | 198/626 |

FOREIGN PATENT DOCUMENTS

| | | | |
|---|---|---|---|
| 2124165 | 12/1971 | Fed. Rep. of Germany | 198/626 |
| 2722216 | 1/1977 | Fed. Rep. of Germany | 198/626 |
| 0091645 | 11/1966 | France | 198/626 |

*Primary Examiner*—Robert J. Spar
*Assistant Examiner*—D. Glenn Dayoan
*Attorney, Agent, or Firm*—Remy J. VanOphem

[57] ABSTRACT

A twin-belt band conveyor in which the flat belt of an endlessly circulating conveyor band forms a closed conveying space with a belt of a cover band running along therewith on a steep conveying track, the edges of each belt being held in superimposed arrangement by guides along the longitudinal sides of the conveying space, the conveying space (34, 50) being formed by indentations of at least one of the belts between the guide, and opened at the end of the steep track by a deflection of the cover band directed around a turn, and the indented belt being straightened out for its return travel. The cover band belt (2) has tensile reinforcements disposed in its longitudinal sides and transverse reinforcements which cooperate with the tensile reinforcements are provided in the cover band, the indentations and straightened out areas (32 to 34) being formed between the transverse reinforcements and the tensile reinforcements, and the belt of the conveyor band limiting the conveying space is held flat on the steep track and the guides of the upwardly moving belt strands are of continuous design.

11 Claims, 6 Drawing Sheets

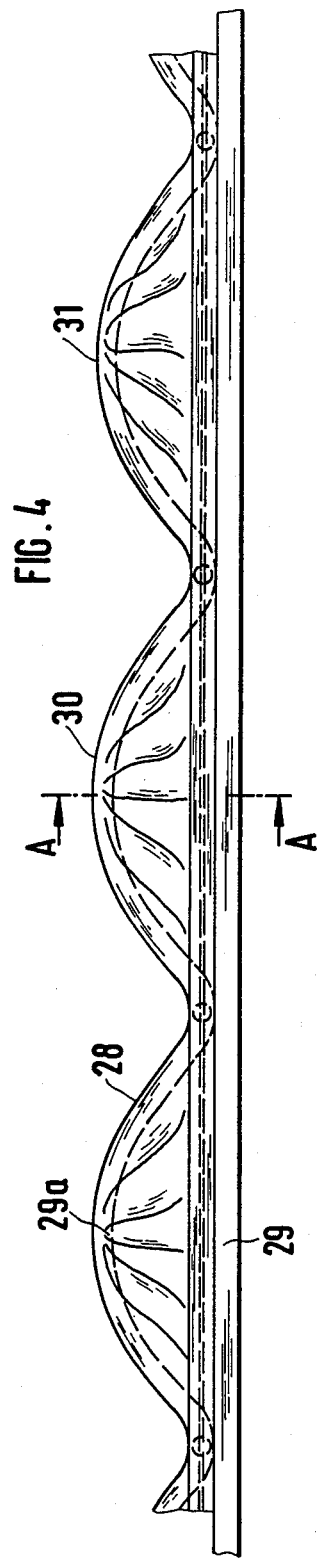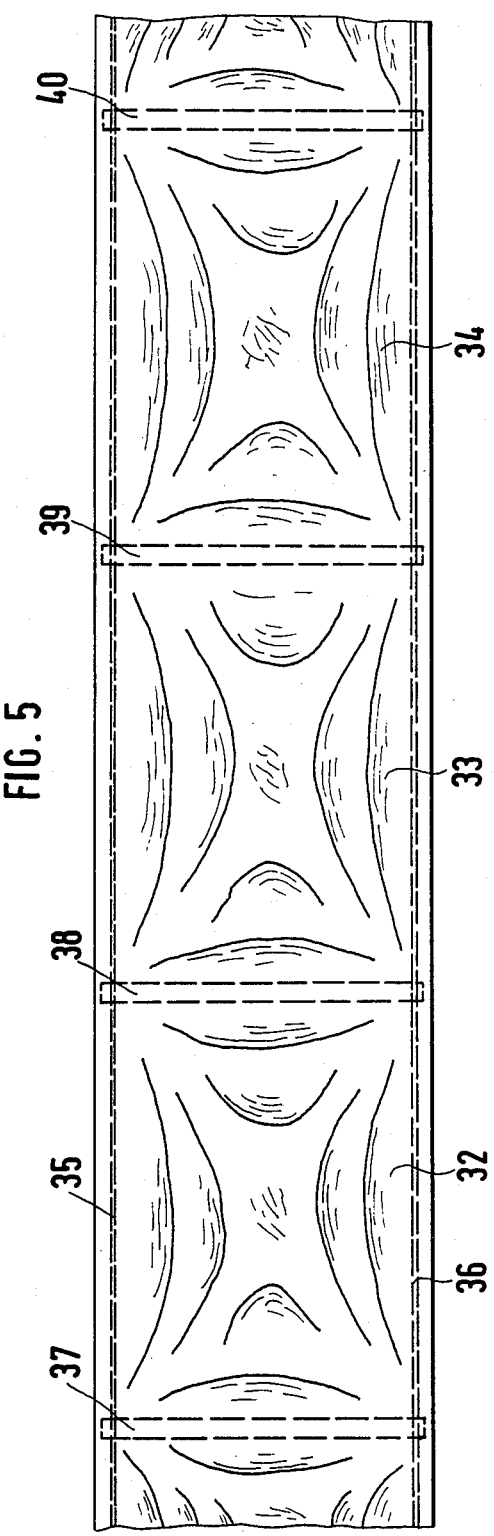

TWIN-BELT BAND CONVEYOR

BACKGROUND OF THE INVENTION

1. Field of the Invention

The present invention relates to a twin-belt band conveyor.

2. Description of the Prior Art

The inventive twin-belt band conveyors are for transporting materials which would slide or roll off the conveying upper or lower belt on a steep conveying track of a conveyor band. In the case of bulk goods, the critical angle for conveying such goods on bands is between 30° and 35°. In general, it depends not only on the conditions possessed by the material to be conveyed by band but also on the band speed which, however, cannot be increased at will in view of the throwing effect of the band discharge. The danger of segregation plays a part here in many cases. This applies in particular to bulk goods and material to be conveyed of a similar consistency, including concrete. The inventive twin-belt band conveyor is suitable for conveying the above-mentioned materials because it can be operated at a selectable band speed which takes the danger of segregation into consideration accordingly but does not impair the conveying effect.

The inventive twin-belt band conveyor has a high degree of uniformity compared to bucket conveyors but is much less complicated technically and is contaminated much less by the material to be conveyed when it is sticky or viscous. This is due to the fact that the indentations formed between the guide means to form the conveying space on the steep tracks are straightened out again behind the steep track, so that the flat form of the conveyor belt is restored at least on the bends.

The invention starts from a known twin-belt band conveyor. The cover band and the conveyor band thereof are designed as smooth conveyor belts. The guide means consist of spaced spring roller assemblies which bend the two flat belts around the material to be conveyed brought together in the middle of the conveyor belt by its trough shape before the steep track, thereby forming a conveying space with a lentiform cross-section which is held together by the spring roller assemblies. The pulling effect is based on the inner friction of the material to be conveyed, which is increased by the inwardly directed pressure of the middle sections of each conveyor belt between the spring roller assemblies. This has an adverse effect on very sticky or mud-like or very fluid material to be conveyed. Furthermore, the inner friction is too small in particular in the case of mud-like material, even if considerably higher pressure is used, to achieve the small slippage between the material to be conveyed and the conveyor belt as is required for transport on steep conveying tracks. Furthermore, the more fluid, pourable or fine-grained the material being conveyed is, the more trouble-some the leaks in the conveying space are which occur between the spring roller assemblies forming the guide means. They are due to the uneven bearing pressure of the belt edges which are supposed to seal off the conveying space.

The invention is based on the problem of achieving a satisfactory constant transporting effect in a twin-belt band conveyor of the type assumed as being known, even in the case of sticky and mud-like or very fluid bulk goods, without having to use a band speed too high with regard to the danger of segregation.

SUMMARY OF THE INVENTION

The longitudinal reinforcements disposed according to the invention in the longitudinal sides of the cover band and thus below the cover band material fitting tightly with the conveyor band transmit the tensile stresses of the conveyor belt, thereby preventing the belt from being deformed toward the conveying space. The transverse reinforcements transmit compressive forces and tensile forces between the cover band edges. The indentations are thus located between the transverse reinforcements of the cover band which extend approximately in a ladder shape, whereby the longitudinal edges of the cover band follow the uprights on the outside and the band edges connecting them and the indentations are located above the shear-resistant transverse reinforcements and follow the rungs. This results in a plurality of dents between the described flat areas of the cover band belt on which there is no deformation of the belt. The longitudinal edges of the cover belt can, therefore, be pressed along their entire length onto the conveyor band in the continuously formed guide means, thereby achieving an even sealing pressure which also seals the conveying space off from the outside for liquid material being conveyed. On the other hand, the flat areas corresponding to the rungs form the limits protruding into the conveying space of the indentations, so that the distance between the shear-resistant transverse reinforcements determines the number of pushers effective along a given steep track, in front of which pushers the material to be conveyed banks following gravity.

Since the belt material is not reinforced here between the longitudinal and transverse reinforcements and is entropy elastic due to the elastic or elastomer rubber or synthetic material usually used for such belts, the energy required for the indenting and straightening out can be kept low, thereby keeping the stress on the material within limits.

The indentable fields of the cover band belt may be formed in a trough shape. The shape of the indentations which is crucial for the pulling effect comes about automatically and in conformity with the preselected shape at the beginning of the steep track. The straightening out can be set in such a way that a flat shape of the cover band belt comes about behind the turn.

The latter design is in particular desirable because it makes it possible to clean the cover band completely of the material which has been carried along.

The straight frontal sections of the transverse reinforcements make it possible to form the indentations in self-contained compartments which successively form the conveying space. It is then possible to limit the slippage between the material to be conveyed and the belts to the compartments, thereby keeping it low.

The invention is also advantageous in that it allows for a relatively simple design of the guide means, which keep the longitudinally reinforced edges of the cover band on the belt edges of the conveyor band, thereby sealing the conveying space off from the outside. Common steel sections may be used for this purpose, being easily provided on the bed frame, in particularly screwed thereonto.

The use of a U-shaped or C-shaped guide rails make it possible for the reinforcements required for more heavily loaded cover band belts to be provided in the belt more easily because the turned up portions offer a larger cross-section of material for this purpose. These turned up portions are used at the same time for guiding and thereby allow for form closure in the transverse direction which removes corresponding forces acting on the cover band belt to the guide means.

BRIEF DESCRIPTION OF THE DRAWINGS

The details of the invention can be found in the following description of an embodiment with reference to the figures in the drawing. These show:

FIG. 4 is a side view of the belts on the steep track of the particular twin-belt band conveyor;

FIG. 5 is a top view of the object of FIG. 4;

DETAILED DESCRIPTION OF THE PREFERRED EMBODIMENT

Figure 1:
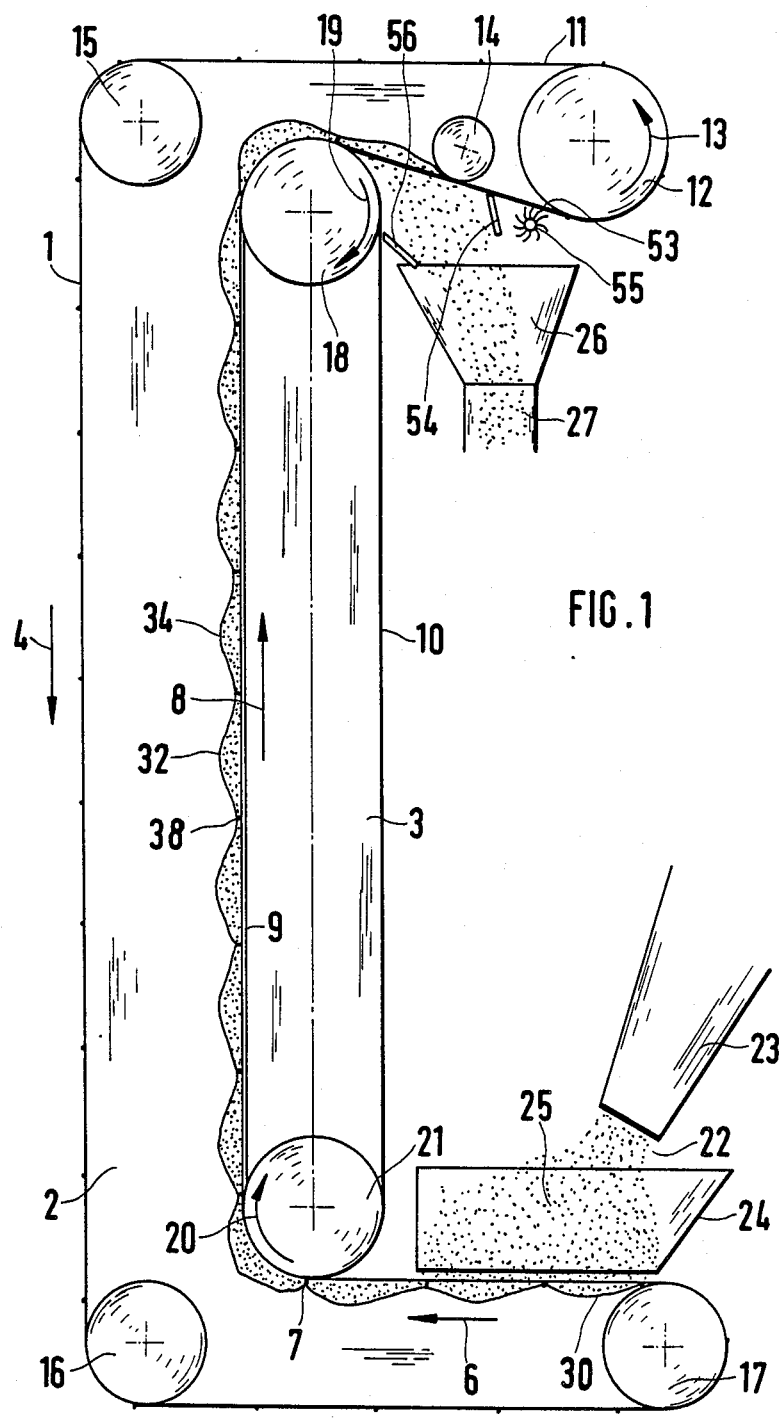
FIG. 1 is a schematic side view of a twin-belt band conveyor according to the invention in a C-shaped arrangement.

In the figures, the twin-belt band conveyor, generally referred to as 1, is composed of two conveyor bands, i.e. a cover band conveyor 2 and a conveyor band 3. The cover band conveyor 2 has, according to the view in FIG. 1, a conveyor strand 5 disposed on the outside and running back according to arrow 4, and a conveyor strand 7 running forward according to arrow 6. The conveyor strand 7 moves at approximately the same speed as a conveyor strand 9 which runs forward according to arrow 8 in the conveyor band 3, whose returning conveying strand is referred to as 10. A driving pulley 12 disposed at a turn 11 of the cover band conveyor 2 rotates accordingly in a counterclockwise direction following an arrow 13, in cooperation with a pressure roller 14. Deflecting pulleys 15, 16 and 17, which also rotate in a counterclockwise direction, deflect the returning conveyor strand 5 in the C shape shown.

The described direction of rotation means that a driving pulley 18 of the conveyor band 3 rotates in a clockwise direction following an arrow 19, which is also true of the direction of rotation of the return pulley 21 of the conveyor band, its direction being characterized by an arrow 20. In the conveying direction before the return pulley there is a band feeder 22 consisting essentially of a closed feed chute 23 and a feed hopper 24. According to the embodiment shown, the twin-belt band equipment conveys concrete, which is shown schematically at 25. At the end of the steep track given by conveyor band 3, the concrete is fed at 26 into a tubular bin or distributor 27.

Figure 6:
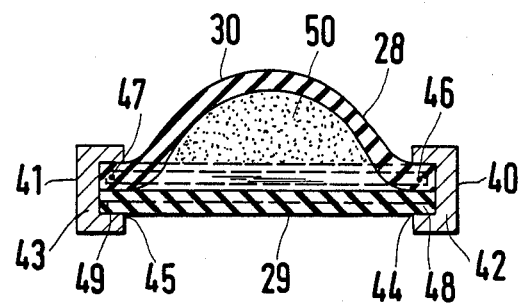
FIG. 6 is a cross-section along line A/A of FIG. 4.

In the views of FIGS. 4 to 6, the belt arrangement is shown on the steep conveying track with the other details omitted. A cover band belt referred to in general as 28 has on this part of the track indentations 29a to 31 arranged one behind the other and together limiting a conveying space closed off from the outside, the other side of which is closed off by a flat belt 29 of the conveyor band 3. As can be seen in the view of FIG. 5, the indentations are located in fields or troughs 32 through 34 between reinforcements of the belt. These are longitudinal reinforcements 35 and 36 each formed, for example, by one or more ropes or cables arranged one beside the other. They are accordingly flexible and can be directed around the various pulleys and rollers which support and deflect the cover band. Transverse reinforcements 37, 38, 39 and 40 are also provided, which may be formed, for example, by rods consisting of round steel sections attached to the transverse reinforcements by threading. This results all in all in a ladder shape of the reinforcements in which the shear-resistant transverse reinforcements 37, 38, 39 and 40 form the rungs and the flexible longitudinal reinforcements 35 and 36 form the uprights.

The belt material is formed in a trough shape in the fields 32 to 34, thus forming the indentations 29a to 31. As can also be seen in the view of FIG. 1, the transverse and longitudinal reinforcements are located on the same plane, which extends parallel to the plane of flat belt 29.

It can be seen in the view of FIG. 6 that continuous longitudinal guide means 41 and 42 are arranged on both longitudinal edges of the cover belt band and flat belt 28 and 29, respectively. These longitudinal guide means have a mirror-symmetrical design and are composed of U-shaped steel sections 43 attached to the bed frame (not shown). Inwardly directed profiled openings 44 and 45 receive edges 46 and 47 of the cover belt band 28 and 48 and 49 of the flat belt 29. They ensure an even sealing pressure in this band area, which seals off from the outside the conveying space described which is referred to in general as 50.

Figure 7:
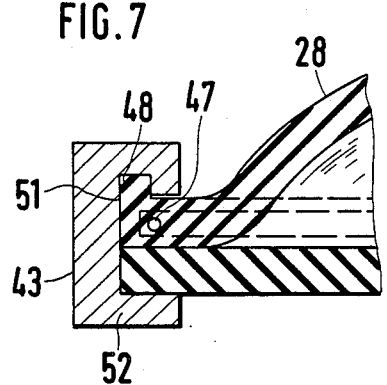
FIG. 7 is an enlarged view and a view corresponding to FIG. 6 of a modified embodiment of the twin-belt band conveyor.

In contrast with the embodiment shown in FIG. 6, the cover belt band 28 has a turned up portion 48 made of the elastomer band material on each of its edges 46 and 47 in the embodiment of FIG. 7. The guide means 41 and 42 again have a mirror-symmetrical design and have a C-shaped profile, as can be seen in the guide means 41 shown. The turned up portion 48a of the cover belt band 28 is directed into a in profiled recess 51. A lower profiled arm 52 is straight and, thus, has no recess.

When the twin-belt band conveyor 1 as in FIG. 1 is operated, the indentations 30 are formed behind the return or deflecting pulley 17 under the load of the concrete 25. This creates a trough-shaped cover band on the straight conveying track until return pulley 21, in which a plurality of troughs 32 to 34 succeed one another. As soon as the troughs reach the return pulley 21 the belt of cover band 3 forms a cover for the troughs 32 to 34 in the conveyor strand 9, whereby successive the troughs 32 to 34 are also sealed off from one another in the area of the transverse reinforcements, as shown for example at 38.

This prevents the material to be conveyed, which follows gravity, from slipping on the conveyor belts at these places. The concrete material is accordingly conveyed upward following the arrow 8 and finally directed around the driving pulley 18. The concrete is discharged behind the driving pulley from the trough shown there and reaches the bin 27.

The troughs 32 to 34 are straightened out at the pressure roller 14. This already results in a flat shape of the cover band conveyor at 53, i.e. before it is wrapped around the driving pulley 12. The flatness is exploited for a stationary stripping means 54 and a cleaning brush 55 which cleans the cover band conveyor before the return strand. In view of the contaminating properties of concrete as a material to be conveyed, a further stripping means 56 is provided for the return or conveyor strand 10 of the conveyor band.

Figure 2:
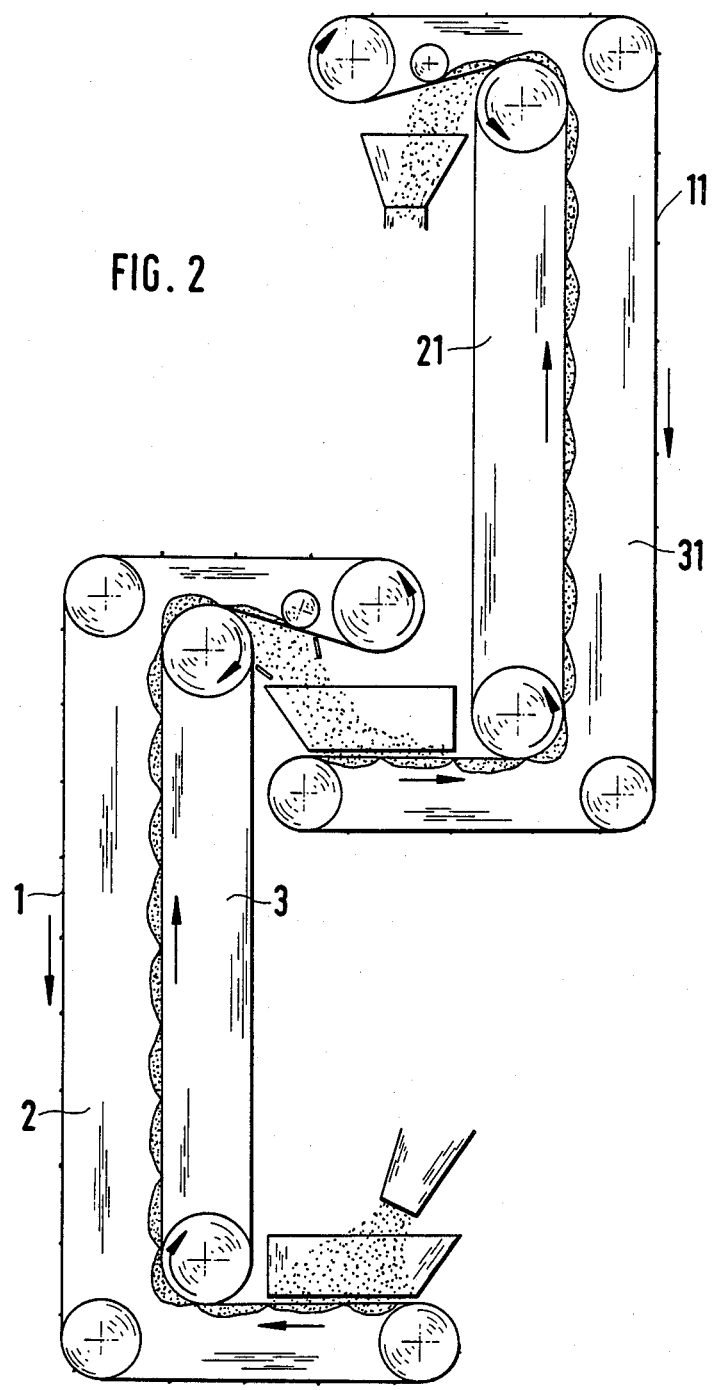
FIG. 2 is a modified embodiment of the inventive twin-belt band conveyor in which the C-shaped arrangement of FIG. 1 has been extended into a Z-shaped arrangement with a second inventive twin-belt band conveyor.
Figure 3:
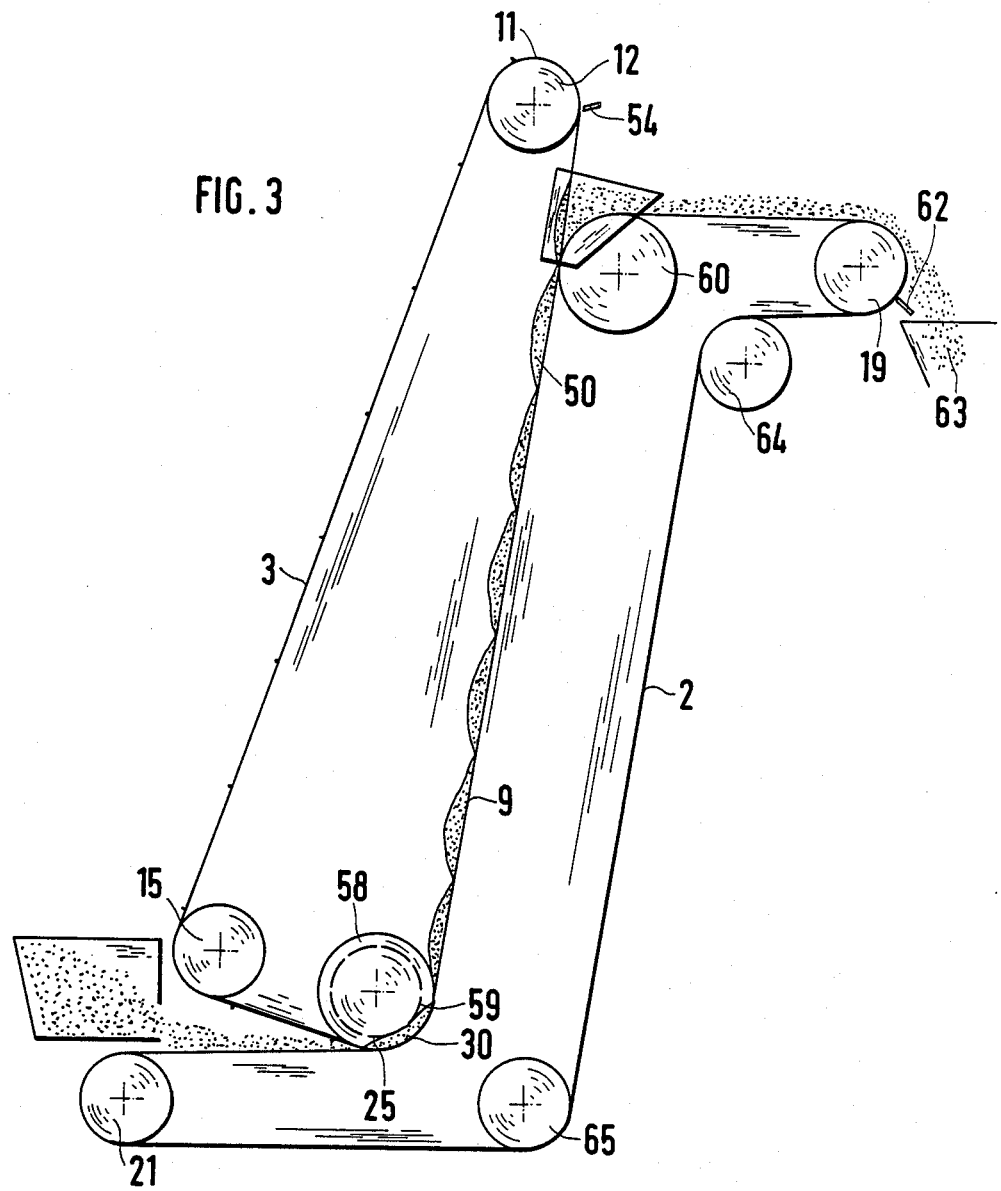
FIG. 3 is a view corresponding to FIGS. 1 and 2 of an S-shaped arrangement of the inventive twin-belt band conveyor.

The view of FIG. 2 shows the possibility of overcoming large conveying heights by arranging a plurality of twin-belt band conveyors 1 according to the view in FIG. 1 in tandem. This is effected according to the embodiment in FIG. 2 by aid of two twin-belt band conveyors 1 and 1', the individual parts of twin-belt band conveyor 1', which is more or less identical to twin-belt band conveyor 1, being identified by the same reference numbers provided with index marks. FIG. 3 shows the cooperation of a cover band conveyor 2 laid in an S shape with a conveyor band 3 whose belt is directed approximately according to the sides of an oblique-angled triangle. The driving pulley 12 is located at the apex of this rotating track, while the following bend at deflecting pulley 15 is located opposite an indenting pulley 58. The shell of the pulley has pocket-shaped depressions 59 into which the indentations or troughs 30 of the cover band are indented. This is effected under the pressure of the concrete 25 which is squeezed in between the forward running conveyor strand 9 of the conveyor band and the cover band in the area where the conveyor band is wrapped around the indenting pulley 58.

Contrary to the design of the twin-belt band conveyor according to FIGS. 1 and 2, the driving pulley 12 of the turn 11 is provided in the embodiment of FIG. 3 for straightening out. The stripping means 54, therefore, acts upon the wrapping around of the cover band because the necessary flat shape only comes about on the deflecting and driving pulley 12.

Corresponding to the S-shaped movement of the conveyor band the concrete 25 is fed to the upper conveyor strand 9 of the cover band conveyor 2 behind the return pulley 21. The coveying space 50 is opened at the turn 11 and a deflecting pulley 60 of the cover band conveyor 2, an approximately even conveying path being present between the deflecting pulley 60 and the driving pulley 18. A stripping means 62 which transfers the material being conveyed to a hopper 63 cooperates with the wrapping of the belt of the cover band conveyor 2 around the driving pulley 18. The lower belt, i.e. the returning strand of the cover band conveyor 2, is directed in accordance with the S shape by aid of deflecting pulleys or rollers 64, the cover band conveyor being kept flat along the entire rotating track as was already the case in the embodiment according to FIGS. 1 and 2.

Figure 8:
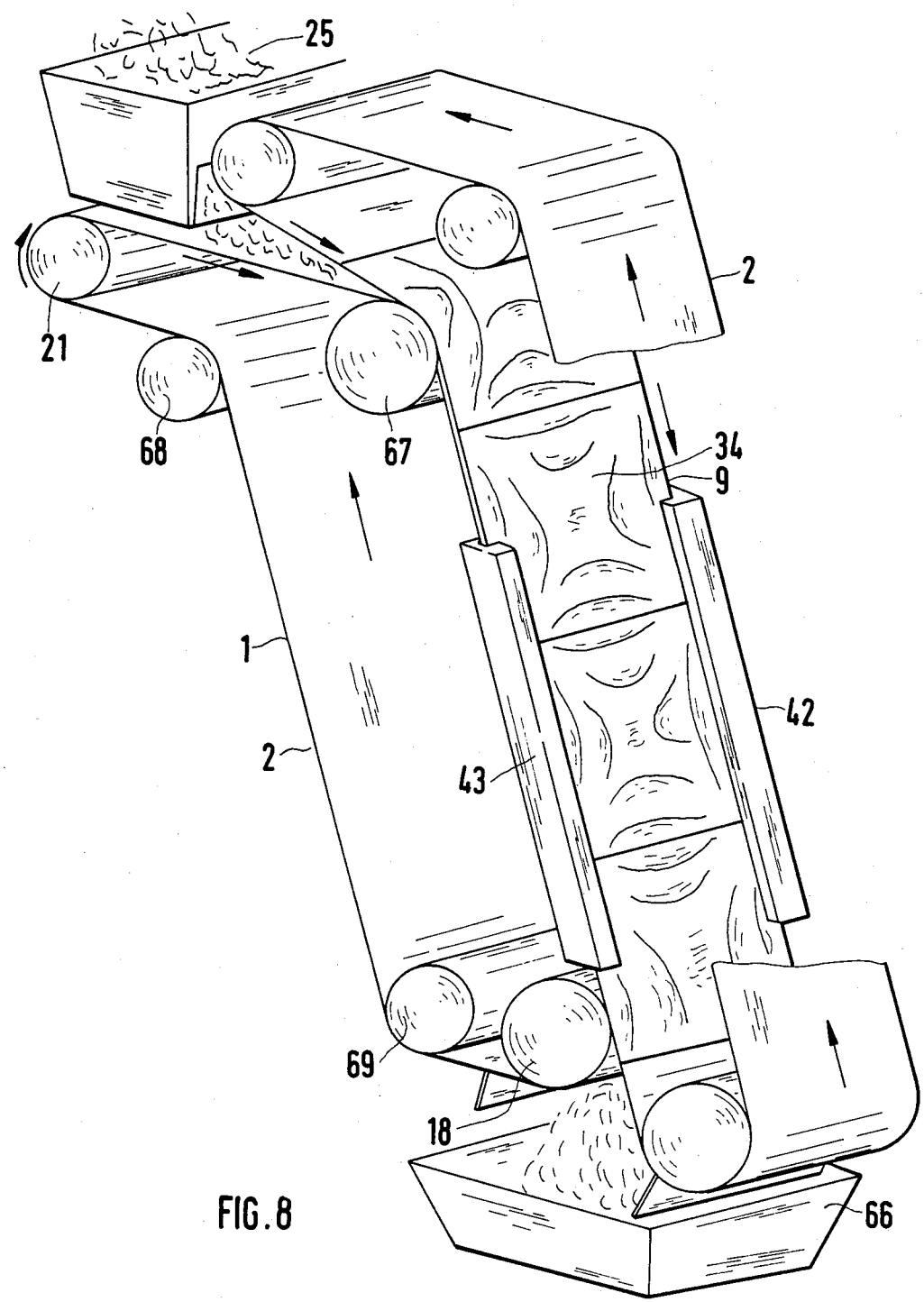
FIG. 8 is a view of a twin-belt band conveyor used, unlike the views of FIGS. 1 to 3, for conveying waste gas.

In the embodiment of FIG. 8, the twin-belt band conveyor 1 serves as a retarding conveyor and thus to convey the concrete 25 from a higher level along a steep track to a lower level into a hopper 66. The direction in which the conveyor belts circulate is characterized by the arrows. The cover band conveyor 2 again forms the described troughs on the steep track, which can be seen from the outside as shown at 34 due to the broken view.

For this purpose, the two continuous lateral guide means 41 and 42 are also shown in a broken view. As in the embodiment in FIGS. 1 and 2, the straightened out portions are formed by the pressure of the material being conveyed between the cover band conveyor and the conveyor band over a deflecting pulley 67 of the conveyor band 3. The deflecting pulley 67 follows the return pulley 21 of the conveyor band in the conveying direction, the latter being preceded by a pressure roller 68 in accordance with the S-shaped course of the conveyor band 3 in the returning strand. The driving pulley 18 of the cover band conveyor 2 again rotates in a clockwise direction. It is followed by a pressure roller 69 in accordance with the design of the band circulation in the conveyor band 3.

The embodiments of the invention have been described above with reference to the conveyance of concrete. Concrete tends to bleed at high conveying speeds in the area where it is discharged behind the steep track. This danger of bleeding is avoided by the self-contained trough-shaped spaces in the conveying space and by a relatively low band speed. The band speed can be increased if the material being conveyed is one not susceptible to segregating, or one for which segregation does not matter. Apart from mudlike material of a different composition, bulk goods, in particular of fine-grained composition, may, therefore, also be conveyed by the inventive twin-belt band conveyor.

What is claimed is:

1. A twin belt conveyor having a steep conveyor track comprising:
   a flat belt forming a first endless circulating conveyor band, said first endless circulating conveyor band having a portion which traverses said steep conveyor track;
   a cover belt forming a second endless circulating conveyor band which engages said flat belt along said steep conveyor track, said cover belt having longitudinal reinforcements disposed in each of its longitudinal sides, a plurality of shear resistant transverse reinforcements disposed in said cover belt at equally spaced intervals along the length of said cover belt to form a plurality of sequential conveying spaces, each conveying space being bounded by said longitudinal reinforcements and two of said transverse reinforcements;
   continuous guide means provided along said steep conveyor track, said continuous guide means holding the sides of said flat and cover belts in a superimposed arrangement and the area of said cover belt underlying said transverse reinforcements against said flat belt to close said plurality of conveying spaces on all four sides as said flat and cover belts traverse said steep conveyor track; and
   means provided at the end of said steep conveyor track for unloading the content of said plurality of conveying spaces.

2. The twin belt conveyor of claim 1 wherein said conveying space between said longitudinal and said two of said transverse reinforcements is indented.

3. The twin belt conveyor of claim 1 wherein said conveying space is indented to a trough shape.

4. The twin belt conveyor of claim 1 wherein said conveying space is indented to a saucer shape.

5. The twin belt conveyor of claim 2 wherein said means for unloading the content of said plurality of conveying spaces includes means for straightening out said indentations of said plurality of conveying spaces.

6. The twin belt conveyor of claim 1 wherein said plurality of transverse reinforcements have straight frontal sections connected at their ends to said longitudinal reinforcements, the portion of said cover belt covering said frontal sections sealingly engaging said flat belt while said flat belt and said cover belt traverse said steep conveyor track.

7. The twin belt conveyor of claim 1 wherein said continuous guide means is a pair of guide rails, one disposed on each side of said flat and cover belts, each of said guide rails having a profiled opening receiving the superimposed sides of said flat and cover belts and holding them in said superimposed arrangement along the fully length of said steep conveyor track.

8. The twin belt conveyor of claim 7 wherein said guide rails have a U-shape and said profiled opening is the open end of said U-shape.

9. The twin belt conveyor of claim 7 wherein said guide rails are C-shaped having a flat section and an internal recess and wherein the longitudinal edges of said cover belt have raised portions which are received in said internal recesses of said guide rails.

10. The twin belt conveyor of claim 1 wherein said plurality of conveying spaces are unreinforced and are capable of being stretched to conform to the material being conveyed.

11. The twin belt conveyor of claim 2 having an indenting pulley which has pocket shaped depressions into which said cover belt is deflected by the material being conveyed to form said indentations.

* * * * *

UNITED STATES PATENT AND TRADEMARK OFFICE
CERTIFICATE OF CORRECTION

PATENT NO. : 4,776,450

DATED : October 11, 1988

INVENTOR(S) : Schwing et al

It is certified that error appears in the above-identified patent and that said Letters Patent is hereby corrected as shown below:

Column 2, line 56, delete "keepting" and insert ---- keeping ----.

Column 2, line 63, delete "particularly" and insert ---- particular ----.

Column 5, line 42, delete "coveying" and insert ---- conveying ----.

Column 5, line 51, delete "S shape" and insert ---- S-shape ----.

Column 6, line 21, delete "mudlike" and insert ---- mud-like ----.

In the Claims

Column 7, line 11, delete "fully" and insert ---- full ----.

In the Abstract

Line 16, delete "(32 to 34) being".

UNITED STATES PATENT AND TRADEMARK OFFICE
CERTIFICATE OF CORRECTION

PATENT NO. : 4,776,450

DATED : October 11, 1988

INVENTOR(S) : Schwing et al

It is certified that error appears in the above-identified patent and that said Letters Patent is hereby corrected as shown below:

<u>In the Drawings</u>

Figure 1, kindly add reference character 5 and its associated lead line.

Figure 2, kindly add reference character 1' and its associated lead line.

Figure 3, kindly delete reference character 19 and replace it with reference character 18.

Figure 7, kindly add reference character 41 and its associated lead line. Also, kindly delete reference character 48 and replace it with reference character 48a.

UNITED STATES PATENT AND TRADEMARK OFFICE
CERTIFICATE OF CORRECTION

PATENT NO.  : 4,776,450
DATED       : October 11, 1988
INVENTOR(S) : Schwing et al It is certified that error appears in the above-identified patent and that said Letters Patent is hereby corrected as shown below:

Figure 8, kindly delete reference character 2 and replace it with reference character 3. Also, kindly delete reference character 43 and replace it with reference character 41.

Signed and Sealed this

Sixteenth Day of May, 1989

Attest:

DONALD J. QUIGG

*Attesting Officer*   *Commissioner of Patents and Trademarks*